May 25, 1965 H. SCHANZ ETAL 3,185,263
SPOT-TYPE DISK BRAKE
Filed Oct. 15, 1962 3 Sheets-Sheet 1

Hans Schanz
Carl Press
INVENTORS:

BY Mestern, Ross & Mestern
AGENTS:

Carl Press
Hans Schanz
INVENTORS.

BY Mestern, Ross & Mestern

AGENTS:

3,185,263
SPOT-TYPE DISK BRAKE
Hans Schanz, Niederhochstadt, and Carl Press, Frankfurt am Main, Germany, assignors to Alfred Teves K.G., Frankfurt am Main, Germany, a corporation of Germany
Filed Oct. 15, 1962, Ser. No. 230,530
Claims priority, application Germany, Oct. 17, 1961,
T 20,972
12 Claims. (Cl. 188—106)

Our present invention relates to a disk brake adapted to stop the rotation of a load shaft (e.g. a crank shaft of an automotive vehicle) under alternatively hydraulic or manual control.

The general object of this invention is to provide means in such brake system for distributing the force of both the hydraulic and the manual actuating mechanism uniformly over two generally segment-shaped brake elements which are positioned to bear upon opposite sides of an annular zone of a disk rotating with the load shaft, thereby insuring an even wear of the brake linings constituting the active parts of these disk-engaging elements.

A more specific object of our invention is to provide means for manually and/or automatically readjusting the operating stroke of the brake elements upon a wearing of their linings.

An important feature of the instant invention resides in the provision of a floatingly disposed yoke which reaches around the disk periphery and acts upon one of the two slidably guided brake elements alongside the disk, the opposite brake element being operatively connected with the proximal one of two hydraulically separable pistons of which the distal one operatively engages the yoke. Pivoted to the yoke is a lever having one extremity operatively coupled with the last-mentioned brake element for shifting it relatively to the yoke, and thereby relatively to the first-mentioned brake element, in a disk-clamping sense when the other extremity of the lever is manually displaced from a normal position in which the two brake elements are spaced from their respective disk faces.

The coupling between the manually swingable lever and the brake element directly controlled thereby may include a plunger which traverses the yoke-actuating distal piston and bears upon the proximal piston through the intervening variable gap, the latter constituting the working chamber of the hydraulic system. Since the manual actuation of the brake elements will in such case tend to increase that gap, with the possibility of objectionable air aspiration into the hydraulic cylinder, we also provide an alternative solution in which the lever acts upon the controlled brake element independently of the associated piston, advantageously by engaging that element at a location between the latter and the proximal piston within a slotted connecting piece inserted therebetween; the connecting piece is positively linked with, at most, one of the two coacting parts, preferably the piston, so that manual displacement of the brake element toward the disk will not disturb the piston position.

Since the maximum separation of the two brake elements or shoes is positively determined by the position of the lever relative to the yoke on which it is fulcrumed, we prefer to make the normal lever position (occurring in the unoperated condition of the brake) adjustable to compensate for the wear of the brake linings so that the clearance therebetween in their disengaged state remains substantially constant. This can be accomplished by the provision of an adjustable linkage through which the lever, when released, bears upon a fixed stop under the action of a restoring spring; such linkage may include, for example, an automatically acting resetting device resistant to dimensional changes in one sense (e.g. foreshortening) but susceptible to such changes in the opposite sense (e.g. lengthening) in response to an increase in the working stroke of the lever. The aforementioned linkage will in such case also include a lost-motion coupling, e.g. between the resetting device and the lever, to allow the latter to fall back by a predetermined distance from its operated position before being backstopped by that device.

In accordance with a further feature of our invention, the yoke is floatingly supported by being secured at one end to the associated brake element which in turn is slidably but preferably nonrotatably guided in a fixed frame for axial displacement, the other end of the yoke riding on a supporting member axially projecting from the distal piston, e.g. on the aforementioned plunger; the yoke may also be engaged at other points by formations on the frame and/or the hydraulic cylinder rigid therewith in order to be held against rotation about the axis of that cylinder.

The above and other objects, features and advantages of our invention will become more fully apparent from the following detailed description given with reference to the accompanying drawing in which.

Figure 1:
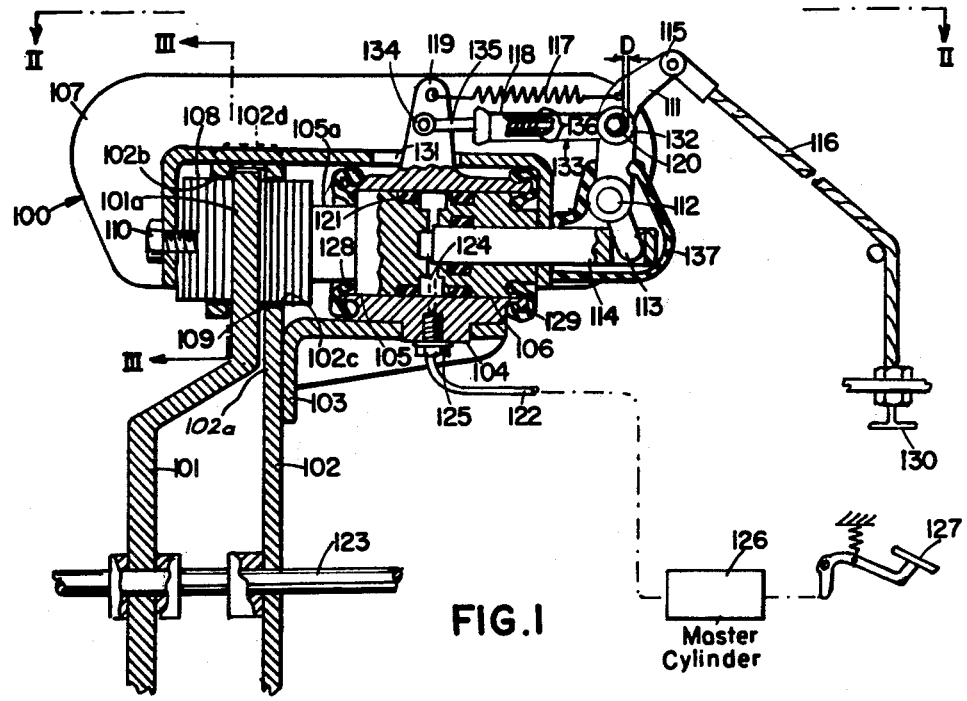
FIG. 1 is a side-elevational view, partly in section, of a hydraulically and manually operable brake system according to the invention.
Figure 2:
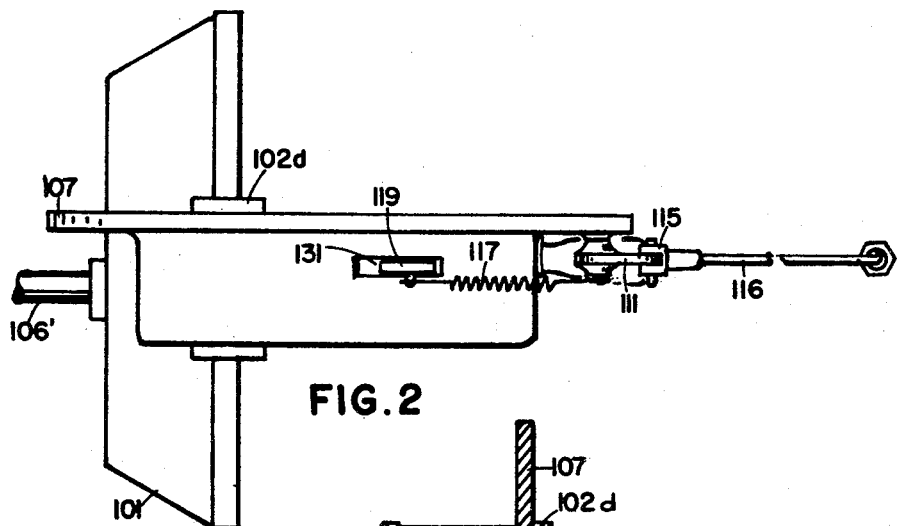
FIG. 2 is a top view taken on the line II—II of FIG. 1.
Figure 3:
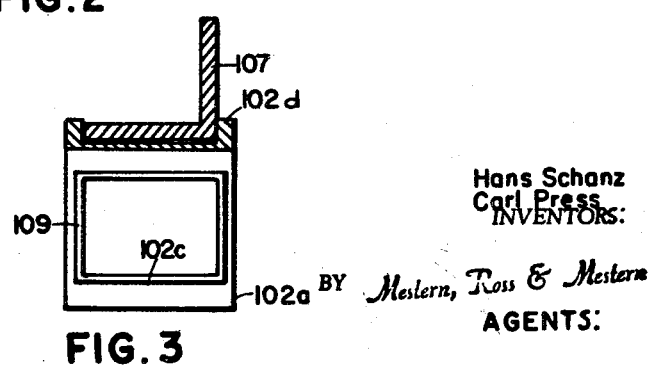
FIG. 3 is a fragmentary sectional view taken on the line III—III of FIG. 1.

In FIGS. 1–3 we show a brake system 100 comprising two pistons 105, 106 slidably disposed within an open-ended hydraulic cylinder 104 which is firmly attached to a bracket 103 and, together with a frame 102 bolted or otherwise secured to this bracket, forms part of a stationary structure. A shaft 123, journaled in the frame 102, supports a brake disk 101 whose annular peripheral portion 101a is straddled by an upward extension 102a of frame 102, of inverted-J shape, which has a pair of aligned cutouts 102b, 102c of generally rectangular outline as seen in FIG. 3. Seated in these cutouts and guided thereby for axial motion relative to disk 101 are a pair of brake shoes 108, 109 of complementary configuration. Shoe 108 is fastened, by screws 110 (only one shown), to one end of a floatingly disposed yoke 107 which bridges the disk 101 and has its other end supported on a plunger 114 projecting axially from cylinder 104. Plunger 114 traverses, in a fluid-tight manner, the distal piston 106 (as seen from the location of the brake shoes 108, 109 with which the cylinder 104 is axially aligned) and bears upon the proximal piston 105 across the intervening variable air space, if any, thereby also exerting pressure upon brake element 109 through an intermediate piston extension 105a constituting a first link means of the present invention. Hydraulic fluid adapted to separate the pistons, thereby forming the aforementioned air space, can enter the annular clearance 124 between the cylinders by way of a nozzle 125 which is connected via conduit 122 to a master cylinder 126 controlled in the usual manner by a pedal 127. Flexible hoods 128, 129 form fluid-tight seals between the cylinder 104 and its pistons 105, 106. The usual piston rings have been indicated at 121.

A lever 111 is fulcrumed on the yoke 107 by a stud 112 and has an extremity 113 in engagement with the projecting end of plunger 114; the opposite, free end 115 of lever 111 is attached to a cable 116 whose remote end is secured to a manually actuatable member here shown as a handle 130. A lug 119, rising integrally from cylinder 104, traverses an elongated slot 131 in yoke 107; rotation of this yoke about the cylinder axis is prevented not only by its attachment to the nonrotatably guided brake element 108 and the interengagement of lug 119 with slot 131 but also by a pair of further lugs 102d rising from the top of frame extension 102a at opposite sides of the yoke. A contact spring 117 is anchored to lug 119 and lever arm 115 so as to tend to swing the lever 111 about its fulcrum 112 in a counterclockwise direction (as viewed in FIG. 1), i.e. in a sense which permits a separation of shoes 108, 109 under the repulsive action of the rotating disk 101 and/or by a suitable restoring force. Such a swing of lever 111 in a brake-releasing sense is limited by a pin 120 which is carried by the lever and received within an eye 132 of slightly larger internal diameter; eye 132 constitutes the free extremity of an automatic resetting device 133 pivoted at 134 to the lug 119. Device 133 comprises a tube 118 telescopically receiving a rod 135 and bearing upon it through the intermediary of unidirectionally effective detent means, such as steel balls 136, which permit free relative movement of parts 118, 135 in an elongating sense but prevent any foreshortening of the device by becoming wedged in the intervening annular space. A flexible shroud 137 envelops the projecting end of plunger 114 and the lever arm 113 connected therewith.

When the system is operated hydraulically, pedal 127 is depressed to admit fluid from master cylinder 126 into the working cylinder 104 with consequent exertion of an outward force upon the two pistons 105 and 106, these pistons being thus driven apart and causing the linings of the brake shoes 108, 109 to bear upon the peripheral zone 101a of disk 101 from opposite sides. It will be apparent that the floating arrangement of yoke 107 automatically centers the brake shoes with reference to the disk and insures even wear of their linings. If brake element 109, piston head 105a, piston 105 and plunger 114 are all positively interconnected, which is not absolutely necessary, the action of the hydraulic fluid will also entrain the lever 111 so that spring 117 is tensioned and provides a restoring force when the fluid pressure is released.

If the brake system is to be actuated manually, handle 130 is pulled so that lever 111 swings clockwise (as viewed in FIG. 1) and, by thus causing a relative displacement between yoke 107 and plunger 114 in pressure-transmitting relationship with brake element 109, forces the two shoes toward each other to clamp the disk 101 between them. When the handle 130 is subsequently released, spring 117 swings the lever 111 counterclockwise but only to the extent permitted by the difference D between the diameters of pin 120 and of the surrounding bore of eye 132. Resetting device 133, because of its extensibility and incompressibility, compensates for any wear of the brake linings of shoes 108, 109 by always allowing the lever 111 to swing clockwise as far as is necessary to provide the required clamping force, under hydraulic or manual actuation, but will always limit the return swing of the lever to an extent determined by the length D of the idle stroke of the lost-motion connection 120, 132 whereby the maximum spacing between the two brake linings will have a predetermined value just slightly greater than the thickness of disk portion 101a.

It will be understood that the yoke 107 is representative of a variety of rigid links connecting the brake shoe 108 with the distal piston 106 and that such links need not necessarily pass wholly outside the cylinder 104, as in the illustrated arrangement.

Figure 4:
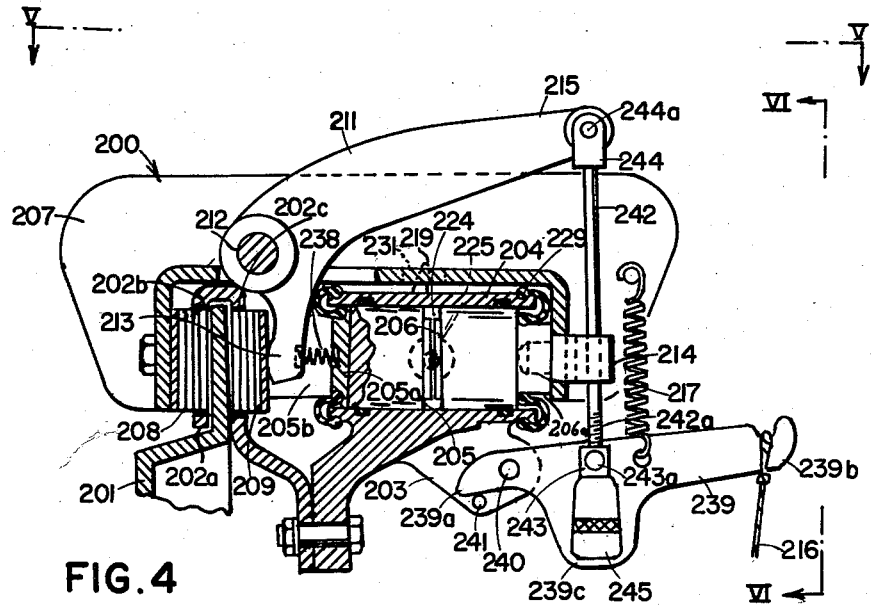
FIG. 4 is a view similar to FIG. 1, showing a second embodiment of the invention.
Figure 5:
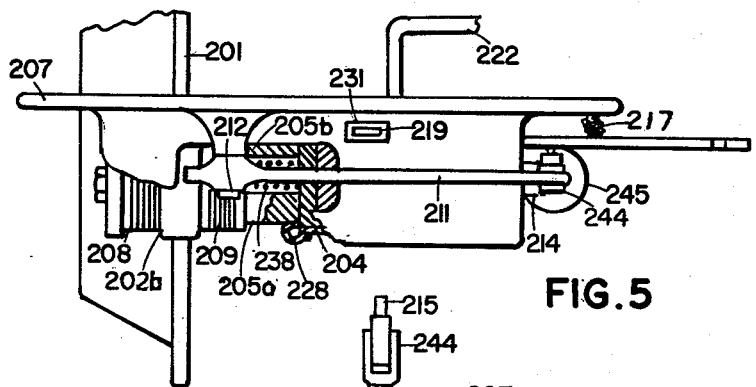
FIG. 5 is a top view taken on line V—V of FIG. 4.
Figure 6:
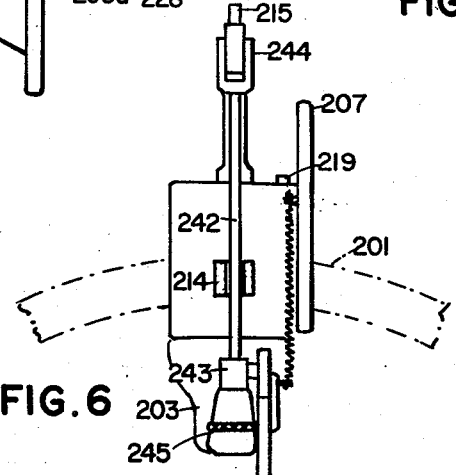
FIG. 6 is an end view taken on line VI—VI of FIG. 4.

In FIGS. 4–6 we show another brake system 200 whose elements, insofar as they are analogous to parts illustrated in FIGS. 1–3, have been designated by the same reference numerals but with a "2" replacing the "1" in the position of the hundreds digit. These parts, though numbered in the drawing, will therefore be referred to hereinafter only to the extent necessary for an understanding of the altered mode of operation.

In the modified system 200 the proximal piston 205 is in pressure-transmitting relationship with the adjacent brake 209 through a generally horseshoe-shaped head 205a having a slot 205b between its legs to accommodate the extremity 213 of lever 211 which is fulcrumed to the yoke 207 at 212. A spring 238 within slot 205b is interposed between lever arm 213 and the closed end of piston head 205a for the purpose of maintaining piston 205 substantially stationary, irrespectively of any motion of lever 211, as long as no hydraulic fluid is supplied to the nozzle 225 by way of conduit 222. Another spring 217, more powerful than spring 238, is anchored to the yoke 207 and to another lever 239 which is pivoted to the cylinder base 203 at 240 and has an extremity 239a normally held against a stop 241 by the spring 217. A connecting rod 242 links the free end 215 of lever 211 with an intermediate point of lever 239 bearing a nut 243 in which the threaded extremity 242a of rod 242 is matingly received. Nut 243 is pivoted to lever 239 by a pin 243a to permit free relative swinging of levers 211 and 239. The effective length of rod 242 is adjustable by rotation of this rod, which is freely journaled in a bracket 244 swingable about a pin 244a in lever arm 215, with the aid of a knurled knob 245 engaging its lower extremity 242a; a shield 239c depending from lever 239 prevents accidental turning of knob 245. The manually tensionable cable 216 is attached to the right-hand end 239b of lever 239 and, when pulled, will cause both levers 211 and 239 to swing clockwise as viewed in FIG. 4, thereby resulting in a relative shifting of shoe 209 and yoke 207 with shoe 208 to clamp the disk 201 between their two brake linings. The end of yoke 207 remote from shoe 208 rides on a boss 214 projecting outwardly from a head 206a of piston 206. The means for holding the lever 211 against rotation about the cylinder axis include a lug 219 extending generally radially outwardly through a slot 231 in the yoke.

The system 200 shown in FIGS. 4–6 enables a manual adjustment of the linkage 239, 242 by which the stroke of lever 211 is determined, this adjustment thus allowing compensation for wear of the linings with maintenance of a definite gap between these linings in the released condition of the brake. Naturally, such gap can also be maintained automatically with the aid of a resetting device bridging the spring 217 as shown with reference to device 133 and spring 117 in the previously described brake system 100, the stop 241 then being redundant.

Since in the system 200 the action of the lever 211 upon the brake shoes is independent of the hydraulic pistons 205 and 206, the relative position of these pistons remains undisturbed during manual operation and no air will be aspirated into the space between them. While the yoke 207 shifts progressively toward the right (FIGS. 4 and 5) with increasing wear of the linings, the working space between the pistons remains substantially centered on the location of inlet 225 as a sufficient hydrostatic head is always maintained in conduit 222 to prevent the piston 205 from approaching the piston 206 under the action of spring 238 in the released position of the hydraulic actuator (brake pedal 127 in FIG. 1).

Figure 7:
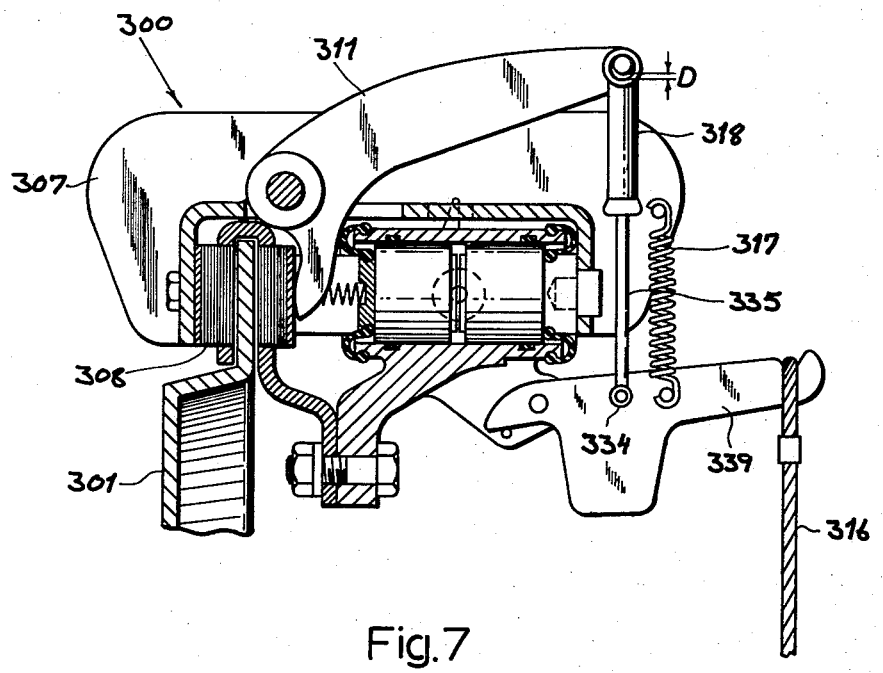
FIG. 7 is a view similar to FIG. 4 of the device thereof provided with an adjusting means of the type shown in FIG. 1.

In FIG. 7, there is shown a disk brake similar to that of FIG. 4, but employing slack-adjusting means of FIG. 1. In this case, the manually tensionable cap 316 is secured to the lever 339 which is fulcrumed to the support in which the pistons are displaceable as previously described. The rod 242 and the manual adjusting thimble 245 of this system of FIG. 4 is replaced by the unidirectional and shortenable resetting device whose tube 318 telescopically receives a rod 335 pivotably connected at 334 to the lever 339. The tube 318, containing the unidirectionally defective detent means of FIG. 1, is pivotally connected with the actuating lever 311 which is pivoted to the yoke 307, the latter having a brake shoe 308 engageable with the disk 301 of the brake device 300. The operation of the system of FIG. 7 is identical with that of FIGS. 4–6 except that, upon release of the brake, rod 335 telescopes into the tube 318 to compensate for wear of the brake shoes under the action of spring 317. The brake play D is thus re-established as set forth in connection with FIG. 1.

Our invention is, of course, not limited to the specific embodiments described and illustrated but may be realized in various modifications without departing from the spirit and scope of the appended claims.

We claim:

1. In a brake system, in combination, a structure including a support, a rotatable disk journaled on said support and coupled with a load, a pair of brake elements disposed adjacent opposite faces of said disk at a peripheral zone thereof, said brake elements being axially slidable toward each other on said support for clamping said disk therebetween, said structure further including a hydraulic cylinder rigidly secured to said support on one side of said disk adjacent one of said brake elements and in substantial axial alignment therewith, a pair of pistons freely movable in said cylinder, first link means operatively connecting said one of said brake elements with the proximal one of said pistons, a yoke floatingly mounted on said structure adjacent said cylinder and reaching around said disk, second link means including said yoke operatively connecting the other of said brake elements with the distal one of said pistons whereby said brake elements are moved toward each other upon separation of said pistons, conduit means opening into said cylinder between said pistons for admitting a hydraulic fluid thereto in a manner urging said pistons apart, thereby forcing said brake elements against said disk, a lever fulcrumed on said yoke in operative engagement with said proximal piston, and manual brake-actuating means coupled with said lever for swinging the latter about its fulcrum in a sense urging said brake elements toward each other, said distal piston being provided with a member projecting axially beyond said cylinder, said yoke having one end supported on said member and having its other end directly secured to said other of said brake elements.

2. The combination defined in claim 1 wherein said other of said brake elements is nonrotatably held in said support.

3. The combination defined in claim 1 wherein said structure is provided with at least one lug projecting generally radially of the cylinder axis, said yoke having a formation slidably coacting with said lug for preventing rotation of said yoke about said axis.

4. The combination defined in claim 1 wherein said support comprises a frame straddling said peripheral zone of said disk, said frame being provided with two cutouts respectively receiving said brake elements.

5. The combination defined in claim 4, further comprising a connecting piece inserted between said one of said brake elements and said proximal piston with freedom of displacement relative to at least one of them, said connecting piece being provided with a slot terminating at said one of said brake elements, said lever having an extremity entering said slot and bearing therein upon said one of said brake elements.

6. The combination defined in claim 5, further comprising spring means interposed between said extremity and said proximal piston for urging the latter toward said distal piston.

7. The combination defined in claim 1, further comprising a linkage joining said lever to said structure with limited relative mobility, stop means including said linkage for limiting the swing of said lever about its fulcrum beyond a predetermined position of maximum mutual spacing of said brake elements, and spring means urging said lever into said position.

8. The combination defined in claim 7 wherein said linkage includes an automatic resetting device with two interengaging parts that are relatively displaceable in one sense only, said parts being arranged to permit progressively increasing swings of said lever in a disk-clamping direction upon wear of the disk-engaging surfaces of said brake elements, said stop means comprising a lost-motion coupling in said linkage determining the maximum swing of the lever in the opposite direction.

9. The combination defined in claim 7 wherein said linkage includes a further lever pivoted on said structure and a rod of adjustable length interconnecting said levers, said stop means being an abutment engageable by said further lever.

10. In a brake system, in combination, a structure including a support, a rotatable disk journaled on said support and coupled with a load, a pair of brake elements disposed adjacent opposite faces of said disk at a peripheral zone thereof, said brake elements being axially slidable toward each other on said support for clamping said disk therebetween, said structure further including a hydraulic cylinder rigidly secured to said support on one side of said disk adjacent one of said brake elements and in substantial axial alignment therewith, a pair of pistons freely movable in said cylinder, pressure-transmitting means between said one of said brake elements and the proximal one of said pistons, the distal one of said pistons being provided with a formation axially projecting beyond said cylinder, a disk-bridging yoke having one end supported on said formation and having its other end rigidly secured to the other of said brake elements, means on said structure for maintaining said yoke in a substantially fixed angular position relative to the cylinder axis while permitting its displacement along said axis, and conduit means opening into said cylinder between said pistons for admitting a hydraulic fluid thereto in a manner urging said pistons apart whereby said brake elements are forced against said disk.

11. In a brake system, in combination, a structure including a support, a rotatable disk journaled on said support and coupled with a load, a pair of brake elements disposed adjacent opposite faces of said disk at a peripheral zone thereof, said brake elements being axially slidable toward each other on said support for clamping said disk therebetween, said structure further including a hydraulic cylinder rigidly secured to said support on one side of said disk adjacent one of said brake elements and in substantial axial alignment therewith, a pair of pistons freely movable in said cylinder, pressure-transmitting means between said one of said brake elements and the proximal one of said pistons, the distal one of said pistons being provided with a formation axially projecting beyond said cylinder, a disk-bridging yoke having one end supported on said formation and having its other end rigidly secured to the other of said brake elements, means on said structure for maintaining said yoke in a substantially fixed angular position relative to the cylinder axis while permitting its displacement along said axis, conduit means opening into said cylinder between said pistons for admitting a hydraulic fluid thereto in a manner urging said pistons apart whereby said brake elements are forced against said disk, a lever fulcrumed on said yoke in operative engagement with said proximal piston, and manual brake-actuating means coupled with said lever for swinging the latter about its fulcrum in a sense urging said brake elements toward each other.

12. In a brake system, in combination, a structure including a support, a rotatable disk journaled on said support and coupled with a load, a pair of brake elements disposed adjacent opposite faces of said disk at a peripheral zone thereof, said brake elements being axially slidable toward each other on said support for clamping said disk therebetween, said structure further including a hydraulic cylinder rigidly secured to said support on one side of said disk adjacent one of said brake elements and in substantial axial alignment therewith, a pair of pistons freely movable in said cylinder, pressure-transmitting means between said one of said brake elements and the proximal one of said pistons, the distal one of said pistons being provided with a formation axially projecting beyond said cylinder, a disk-bridging yoke having one end supported on said formation and having its other end rigidly secured to the other of said brake elements, guide means on said structure for maintaining said yoke in a substantially fixed angular position relative to the cylinder axis while permitting its displacement along said axis, conduit means opening into said cylinder between said pistons for admitting a hydraulic fluid thereto in a manner urging said pistons apart whereby said brake elements are forced against said disk, a lever fulcrumed on said yoke in operative engagement with said proximal piston, and manual brake-actuating means coupled with said lever for swinging the latter about it fulcrum in a sense urging said brake elements toward each other, said support including a frame straddling said disk and formed with a cutout receiving said other of said brake elements and constituting said guide means.

References Cited by the Examiner

UNITED STATES PATENTS

| 2,347,366 | 4/44 | Parnell | 188—106 |
| 2,768,710 | 10/56 | Butler | 188—152 X |
| 2,963,116 | 12/60 | Peras | 188—152 |
| 2,966,964 | 1/61 | Brueder | 188—73 |

FOREIGN PATENTS

| 703,860 | 2/54 | Great Britain. |
| 709,305 | 5/54 | Great Britain. |
| 734,271 | 7/55 | Great Britain. |
| 844,003 | 8/60 | Great Britain. |

ARTHUR L. LA POINT, *Primary Examiner.*

EUGENE G. BOTZ, *Examiner.*